US012621316B2

(12) United States Patent
Burton et al.

(10) Patent No.: US 12,621,316 B2
(45) Date of Patent: May 5, 2026

(54) DNS AUTOMATED INTELLIGENCE

(71) Applicant: Infoblox Inc., Santa Clara, CA (US)

(72) Inventors: Renée Carol Burton, Seattle, WA (US); Christopher June Kim, Puyallup, WA (US); Laura Teixeira da Rocha, Seattle, WA (US); Chance Mitchell Tudor, Athens, GA (US)

(73) Assignee: Infoblox Inc., Santa Clara, CA (US)

( * ) Notice: Subject to any disclaimer, the term of this patent is extended or adjusted under 35 U.S.C. 154(b) by 34 days.

(21) Appl. No.: 18/679,186

(22) Filed: May 30, 2024

(65) Prior Publication Data

US 2025/0097238 A1 Mar. 20, 2025

Related U.S. Application Data

(60) Provisional application No. 63/538,587, filed on Sep. 15, 2023.

(51) Int. Cl.
H04L 9/40 (2022.01)
H04L 61/4511 (2022.01)

(52) U.S. Cl.
CPC ...... H04L 63/1416 (2013.01); H04L 61/4511 (2022.05); H04L 63/0236 (2013.01); H04L 63/1441 (2013.01)

(58) Field of Classification Search
CPC ............. H04L 63/1416; H04L 61/4511; H04L 63/0236; H04L 63/1441
See application file for complete search history.

(56) References Cited

U.S. PATENT DOCUMENTS 12,500,914 B2 * 12/2025 Boord ................. H04L 63/1425
2002/0010798 A1 * 1/2002 Ben-Shaul .......... H04L 67/1021
707/E17.116

(Continued)

FOREIGN PATENT DOCUMENTS

CN 112425139 A * 2/2021 ............. G06F 21/71

OTHER PUBLICATIONS

Marques et al., DNS Firewall Based on Machine Learning, Future Internet, MDPI, 2021, 13, 309, pp. 1-18.

(Continued)

*Primary Examiner* — John B King
(74) *Attorney, Agent, or Firm* — Van Pelt, Yi & James LLP

(57) ABSTRACT

Various techniques for providing a DNS automated intelligence solution are disclosed. In some embodiments, a DNS Automated Intelligence System (DAISy) is disclosed that includes a system designed to create threat intelligence for use in protective DNS, or DNS Detection and Response systems which control access to internet resources at a DNS resolver. The disclosed DAISy solution includes the ingestion of raw source data, the curation and refinement of this source data into specialized data sets used for identifying threats, active processes to increase visibility into internet domain names, and can also include human-in-the-loop acceleration that allows for rapid automation, and a modular incorporation of DNS-specific signatures for identification of suspicious domain names. The disclosed DAISy solution is self-sustaining, automated, and incorporates human guidance. Moreover, it is effective for scaling the detection of malicious and suspicious domains, which is not possible with existing traditional approaches to DNS security.

13 Claims, 10 Drawing Sheets

(56)                    References Cited

U.S. PATENT DOCUMENTS

| | | | | |
|---|---|---|---|---|
| 2012/0054106 A1* | 3/2012 | Stephenson | ............. | H04L 63/12 |
| | | | | 705/50 |
| 2012/0198549 A1* | 8/2012 | Antonakakis | ....... | H04L 61/4511 |
| | | | | 726/22 |
| 2013/0061321 A1 | 3/2013 | Gardner | | |
| 2014/0007238 A1 | 1/2014 | Magee | | |
| 2014/0282887 A1* | 9/2014 | Kaminsky | ........... | H04L 63/1466 |
| | | | | 726/4 |
| 2015/0350240 A1* | 12/2015 | Mitchell | ................. | G06F 21/55 |
| | | | | 726/23 |
| 2015/0373043 A1* | 12/2015 | Wang | .................. | G06F 21/6254 |
| | | | | 706/12 |
| 2016/0127402 A1* | 5/2016 | Veeramachaneni | ..... | H04L 63/20 |
| | | | | 726/23 |
| 2016/0380773 A1* | 12/2016 | Woodworth | .......... | H04L 9/3242 |
| | | | | 713/176 |
| 2016/0381049 A1* | 12/2016 | Lakhani | .............. | H04L 63/1416 |
| | | | | 726/23 |
| 2016/0381077 A1* | 12/2016 | Bassias | .................. | G06N 5/047 |
| | | | | 726/23 |
| 2017/0026391 A1* | 1/2017 | Abu-Nimeh | .......... | G06F 21/552 |
| 2017/0163425 A1* | 6/2017 | Kaliski, Jr. | .......... | H04L 63/123 |
| 2018/0167405 A1* | 6/2018 | Comay | .............. | H04L 63/1408 |
| 2020/0351270 A1* | 11/2020 | Burton | ................ | H04L 63/0227 |
| 2021/0168160 A1* | 6/2021 | Wang | .................. | H04L 61/4511 |
| 2021/0266293 A1 | 8/2021 | Liu | | |
| 2022/0060477 A1 | 2/2022 | Burton | | |
| 2022/0103597 A1* | 3/2022 | Gobena | ................. | H04L 63/205 |
| 2022/0182401 A1* | 6/2022 | Boord | ................ | H04L 63/1425 |
| 2022/0353276 A1* | 11/2022 | Hegrat | .................. | G06N 20/00 |
| 2023/0069845 A1* | 3/2023 | Woodworth | ........ | H04L 63/0227 |
| 2024/0422185 A1* | 12/2024 | Burton | ............... | H04L 63/1483 |
| 2025/0097238 A1* | 3/2025 | Burton | ............... | H04L 61/4511 |
| 2025/0097245 A1* | 3/2025 | Johnson | ............. | H04L 63/1416 |

OTHER PUBLICATIONS

Mitsuhashi et al., Identifying Malicious DNS Tunnel Tools from DoH Traffic Using Hierarchical Machine Learning Classification, Hokkaido University Collection of Scholarly and Academic Papers : HUSCAP, Information Security. ISC 2021Lecture Notes in Computer Science, vol. 13118, Nov. 27, 2021, pp. 238-256.

Saeli et al., DNS Covert Channel Detection via Behavioral Analysis: a Machine Learning Approach, Oct. 4, 2020, pp. 1-10.

Tang et al., A Practical Machine Learning-Based Framework to Detect DNS Covert Communication in Enterprises, 2020.

* cited by examiner

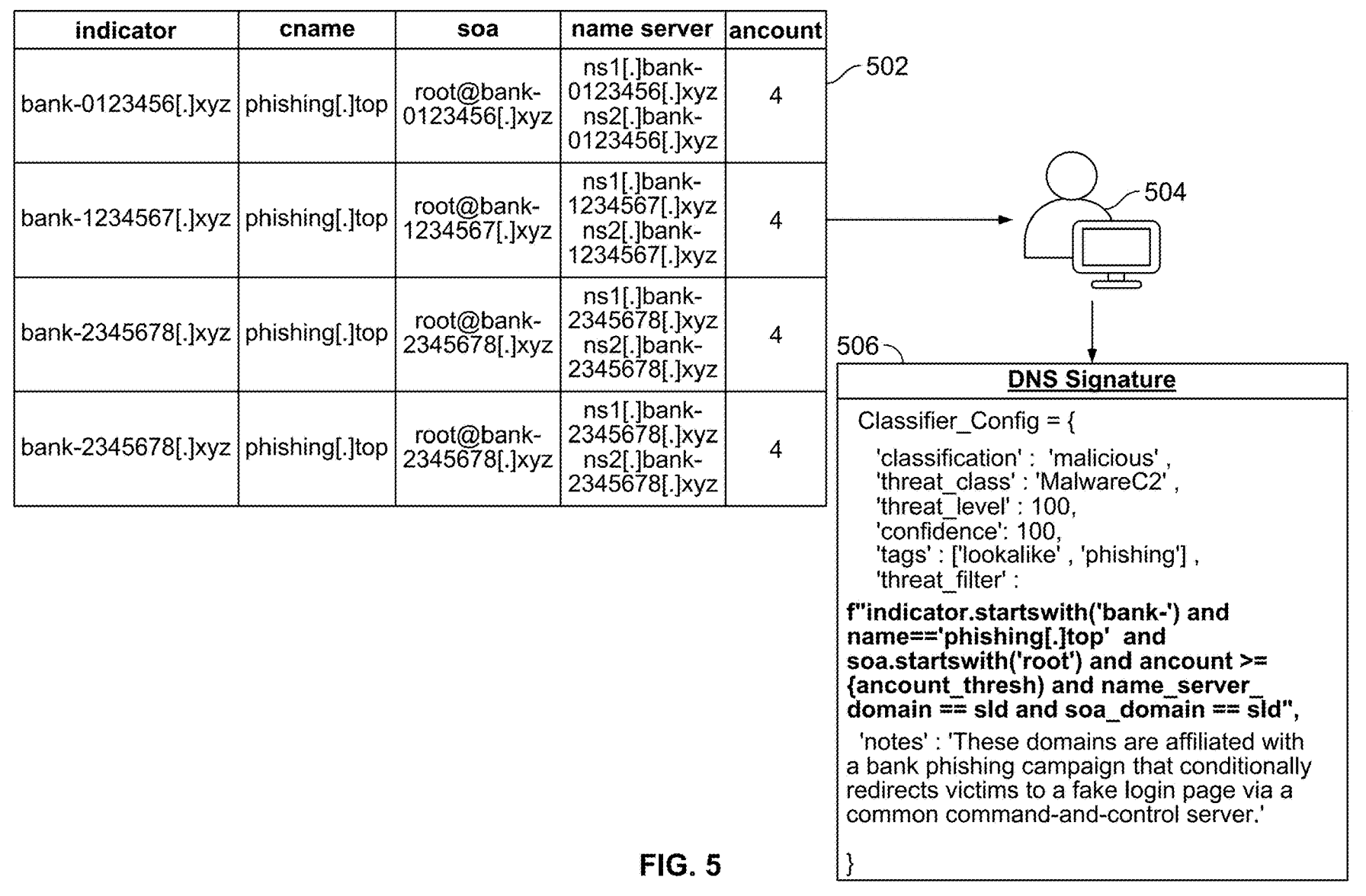

| indicator | cname | soa | name server | ancount |
|---|---|---|---|---|
| bank-0123456[.]xyz | phishing[.]top | root@bank-0123456[.]xyz | ns1[.]bank-0123456[.]xyz ns2[.]bank-0123456[.]xyz | 4 |
| bank-1234567[.]xyz | phishing[.]top | root@bank-1234567[.]xyz | ns1[.]bank-1234567[.]xyz ns2[.]bank-1234567[.]xyz | 4 |
| bank-2345678[.]xyz | phishing[.]top | root@bank-2345678[.]xyz | ns1[.]bank-2345678[.]xyz ns2[.]bank-2345678[.]xyz | 4 |
| bank-2345678[.]xyz | phishing[.]top | root@bank-2345678[.]xyz | ns1[.]bank-2345678[.]xyz ns2[.]bank-2345678[.]xyz | 4 |

502

504

DNS Signature

506

```
Classifier_Config = {

'classification' : 'malicious',
  'threat_class': 'MalwareC2',
  'threat_level' : 100,
  'confidence': 100,
  'tags' : ['lookalike' , 'phishing'] ,
  'threat_filter' :
f"indicator.startswith('bank-') and
name=='phishing[.]top' and
soa.startswith('root') and ancount >=
{ancount_thresh} and name_server
domain == sld and soa_domain == sld", 'notes' : 'These domains are affiliated with
a bank phishing campaign that conditionally
redirects victims to a fake login page via a
common command-and-control server.'
}
```

FIG. 5

1002 Selectively aggregate DNS data from a plurality of networks.

1004 Automatically classify meaningful DNS resources from the aggregated DNS data.

1006 Automatically generate a new DNS signature.

1008 Apply the new DNS signature to monitored network activity.

1010 Perform an action in response to a match of the new DNS signature activity to the monitored network activity.

DNS AUTOMATED INTELLIGENCE

CROSS REFERENCE TO OTHER APPLICATIONS

This application claims priority to U.S. Provisional Patent Application No. 63/538,587 entitled DNS AUTOMATED INTELLIGENCE filed Sep. 15, 2023, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain.

BRIEF DESCRIPTION OF THE DRAWINGS

Various embodiments of the invention are disclosed in the following detailed description and the accompanying drawings.

FIG. 5 is a hypothetical example of a threat researcher manually creating a DNS signature after identifying DNS textual and configuration patterns in accordance with some embodiments.

DETAILED DESCRIPTION

Figure 1:
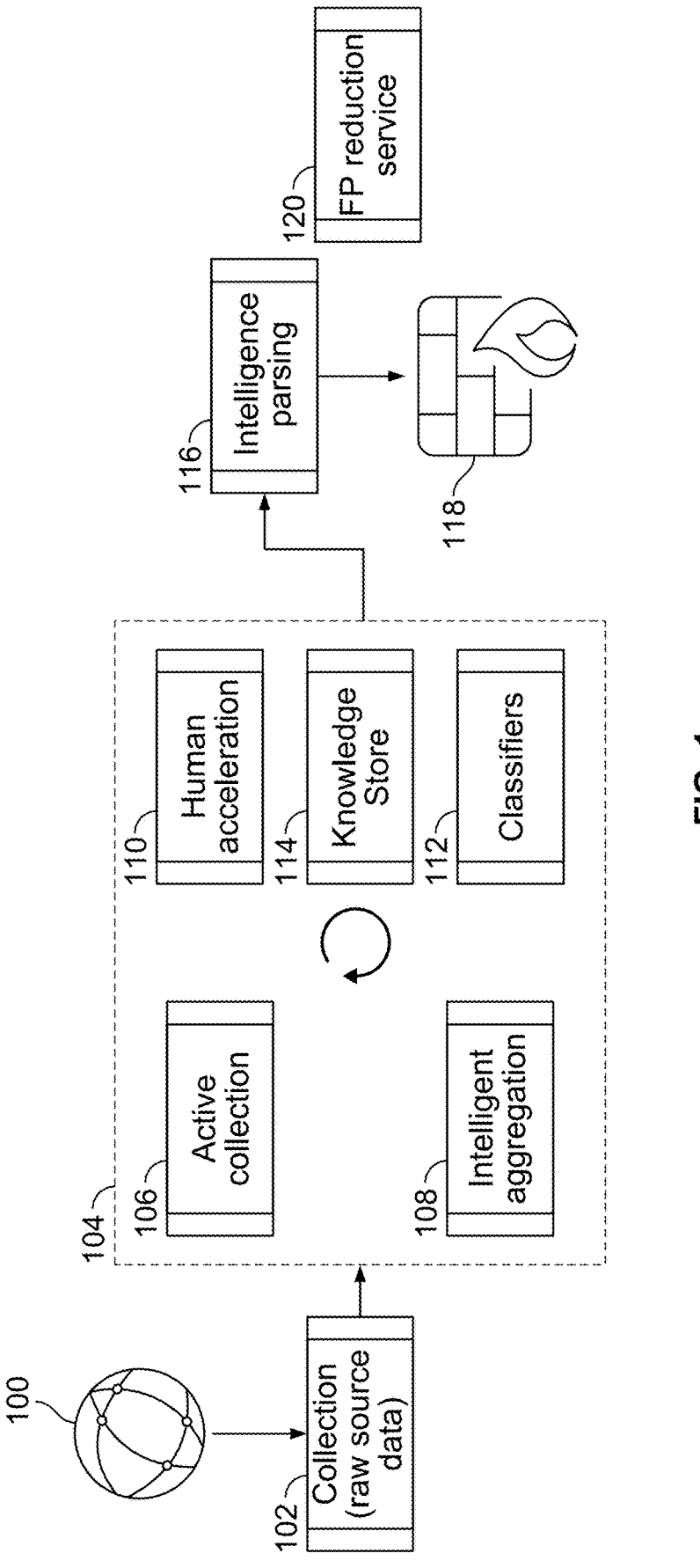
FIG. 1 illustrates DNS Automated Intelligence System (DAISy) components from when we first see DNS resources (e.g., domains and IP address) in the systems from a plurality of networks to their final destination (e.g., a DNS Detection and Response (DDR) resolver) in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names (FQDNs)). Web addresses are translated into IP addresses. The Domain Name System (DNS) translates domain names, which can themselves be web addresses, to IP addresses. Specifically, requests including web addresses are sent to DNS servers that generally reply with corresponding IP addresses or with an error message in case the domain has not been registered, a non-existent domain (e.g., an NX Domain response is returned by DNS servers for a non-existent domain).

Technical Challenges for DNS Security

The Domain Name System (DNS) is a globally distributed database that provides core functionality for the operation of the Internet and local intranets. In particular, DNS provides the ability to locate Internet resource information, for example, IP addresses for domain names. The distributed nature of the DNS allows this resource information to be updated dynamically and controlled by the resource holders. To locate the current information, a client device, for example, a laptop, queries the DNS via a standard protocol. In practice, client devices do not perform the database lookup, referred to as resolution, themselves, but depend on other specialized servers to act on their behalf. These servers are called DNS recursive resolvers (e.g., a DNS recursor), and they are able to expedite the resolution of DNS records for a large number of clients through caching and optimized software. Recursive resolvers can also enact policies, for example, to limit client access to the Internet or specific resources.

DNS Detection and Response (DDR) systems, also referred to as protective DNS systems, typically perform policy actions at a DNS recursive resolver based on a DNS query, response, client, or some other combination of information available to a DNS recursive resolver. As an example, a DDR resolver is able to take different actions in response to a DNS query depending on policy configurations and client information. Notably, the DNS recursive resolver can block resolution of a query or log the activity for late analysis. While different DDR systems generally offer different features, common to any DDR system is intelligence about DNS resources, specifically, domain names and IP addresses. The term intelligence is used here to generally refer to a description of DNS resources (e.g., domain names and IP addresses) along with a set of attributes about those resources, including, for example, a threat classification, annotation, or association with known services. In the most common use cases, these domain names and IP addresses are suspicious or known to host malicious content, though they can also include details about legitimate domains, such as those associated with popular applications. DNS recursive resolvers often enact policies via methods known as Response Policy Zones (RPZ), but other methods are implemented across the industry. As will be further described below, the disclosed DNS Automated Intelligence System (DAISy) can provide intelligence that is used by a DDR resolver.

High quality intelligence for DDR resolvers is critical to success in securing a network from early and persistent threats. As of 2022, it is estimated that over 90% of all malicious actors utilize DNS to deliver malware or maintain access to compromised devices. As such, security at the DNS layer of the network stack can provide the ability to prevent compromise or disrupt malicious communications by preventing access to the information necessary to make a connection. At the same time, inaccurate intelligence in a DDR resolver can cause a network outage if the DNS resolver prevents access to critical resources (e.g., critical enterprise resources). As such, DNS intelligence for use in a DDR resolver should generally maximize protection of the client networks while ensuring their performance.

Thus, new and improved techniques for DNS security are needed.

Overview of Techniques for a DNS Automated Intelligence Solution

Various techniques for providing a DNS automated intelligence solution are disclosed. In some embodiments, a DNS Automated Intelligence System (DAISy) is disclosed that includes a system designed to create threat intelligence for use in protective DNS, or DNS Detection and Response (DDR), systems that control access to Internet resources at a DNS resolver. This system covers the ingestion of raw source data, the curation and refinement of this source data into specialized data sets used for identifying threats, active processes to increase visibility into Internet domain names, human-in-the-loop acceleration that allows for rapid automation, and a modular incorporation of DNS-specific signatures for identification of suspicious domain names. This system is self-sustaining, automated, and can also incorporate human guidance. The disclosed DAISy solution is effective for scaling the detection of malicious and suspicious domains not possible with traditional approaches.

In some embodiments, a system/process/computer program product for DNS automated intelligence (DAISy) includes selectively aggregating DNS data from a plurality of networks (e.g., the aggregated DNS data is collected from a plurality of monitored enterprise, university, and/or government networks); automatically classifying meaningful DNS resources from the aggregated DNS data; and sending new threat domains to a DNS threat feed.

For example, a new domain server can be identified as a compromised or an inherently malicious or suspicious name server, and wherein new domains associated with the new domain server are monitored to identify new malicious domains.

As another example, a new threat domain can be identified, and an action can be performed in response to detecting the new threat domain.

In some embodiments, a system/process/computer program product for DAISy includes blocking the new threat domain in near real-time at a DNS security platform, wherein the new threat domain is blocked at least for a predetermined period of time.

In some embodiments, a system/process/computer program product for DAISy includes reporting the new threat domain for a first network based on a DNS security policy associated with the first network.

In some embodiments, a system/process/computer program product for DAISy includes quarantining an unclassified domain for further security professional review to update configuration for a classifier.

In some embodiments, a system/process/computer program product for DAISy includes automatically generating a new DNS signature for a new DNS threat using a statistical classifier.

In some embodiments, a system/process/computer program product for DAISy includes periodically revisiting the new threat domain during a predetermined time window to update threat intelligence information associated with the new threat domain.

In an example implementation, DAISy creates intelligence data designed specifically for use in DDR resolvers. In particular, DAISy provides mechanisms to evaluate a domain name over its entire lifecycle, from registration to expiration, as well as the ability to identify anomalous domain name and IP activity across distinct networks served by the DNS resolver. DAISy utilizes both DNS query response logs and external enrichment data. For improved performance, the DDR resolver logs network attribution. This allows DAISy to separate DNS activity between two networks and improve the intelligence that is generated.

Specifically, in this example implementation, DAISy provides a DDR resolver intelligence data with the following example characteristics: (1) classification of domain names and IP addresses as legitimate, suspicious, or malicious with further categorization information including the confidence level in the classification, the threat level, a categorization of the resource, and a time-to-live (TTL) of the classification; (2) annotation of the classification including supporting details for downstream consumers, for example, Security Incident Event Managers (SIEM) and DDR reporting tools; (3) reevaluation of a domain name over the lifecycle of the domain, particularly during the period in which it is active within the DNS resolver networks; (4) low likelihood of network outage caused by false positives (FPs); (5) relevance to the networks served by the DDR system; (6) inclusion of low query volume threats as found in advanced DNS beaconing or targeted attacks within the networks served by the DDR and its resolvers; (7) the ability to connect DNS resources controlled by the same DNS infrastructure actor over time; and (8) reputation scores for DNS infrastructure elements, such as name servers, TLDs, or hosting providers, allowing the resolver to construct policies based on reputation configurations.

Threat intelligence that is used in recursive resolvers for policy enforcement is typically delivered as a list of domain names or IP addresses and aggregated from various sources that are not DNS specific. For example, many antivirus companies produce threat intelligence by extracting domain names and IP addresses from malware samples. Other systems process URL data and scrape websites to identify potentially harmful content; those which are malicious are used in blocklists.

In contrast, DAISy is designed to learn threats from domain names and how they are utilized within the Domain Name System (DNS). This combination of domain information and its usage creates unique DNS signatures on which the disclosed DAISy techniques are based. These signatures are discussed further below and can include a number of features, including, for example, configuration of the domain and query patterns from client devices.

Thus, new and improved techniques for a DNS automated intelligence solution (DAISy) are disclosed. Example embodiments for DAISy are further described below.

Example System Embodiments for a DNS Automated Intelligence Solution (DAISy)

DAISy generally refers to a system architecture for processing indicators, including DNS resources, through their entire lifecycle, with the purpose of protecting end users and computing entities of the DDR systems from accessing Internet resources that are associated with malware (e.g., malicious content). In an example implementation, an architecture for DAISy is composed of multiple components that are tied to and sustained by each other, in which their relationship may not necessarily be a linear workflow. Each component of the system has unique value in contributing intelligence that will be used by DDR resolvers. The system is built to be self-sustaining, capable of making decisions autonomously (e.g., and, in some cases, can also utilize human expertise and feedback to enhance and expedite the process of discovery as further described below). Through its component processes, DAISy gathers information over time that increases knowledge about DNS resources, increases confidence, validates and improves detections, and builds continuous knowledge about these resources until they are no longer active.

FIG. 1 illustrates DNS Automated Intelligence System (DAISy) components from when we first see DNS resources (e.g., domains and IP address) in the systems from a plurality of networks to their final destination (e.g., a DNS Detection and Response (DDR) resolver) in accordance with some embodiments. Specifically, FIG. 1 illustrates example DAISy components from when we first see DNS resources (e.g., domains and IP addresses) in the systems from a plurality of networks to their final destination, which is the DDR resolver.

As shown in FIG. 1, DAISy includes the multiple phases that occur after the raw source data from a plurality of networks 100 is collected as shown at 102, and before the intelligence is provided to the DDR resolver. The disclosed DAISy system architecture as shown generally at 104 is focused on producing unique values through each of its components that will help in gathering knowledge and making decisions for the observed DNS resources. Each component of the DAISy system architecture (104) plays a role in enabling the system to generate valuable intelligence, specifically tailored to the networks supported by the DDR. This intelligence can be acquired and expedited with human and/or machine learning (ML) guidance as shown at 116, facilitating a self-sustaining, defendable, and efficient approach. The results are then provided to a DNS security platform 118 for enhanced DNS security as will be further described below. As also shown in FIG. 1, a false positive (FP) reduction service 120 is an external component that attempts to remove false positives (FPs) from the algorithms before they are made available to the DDR system.

FIG. 1 shows the different components that DAISy is composed of including the following: (1) Active collection as shown at 106; (2) Intelligent aggregation as shown at 108; (3) Human acceleration as shown at 110; (4) Classifiers as shown at 112; and (5) Knowledge store as shown at 114.

The initial stages of the system involve the first two components on the left, namely active collection (106) and intelligent aggregation (108). These stages serve generally as the foundation for the overall system processing and its subsequent detections. However, it is important to note that this relationship is not strictly linear. For instance, a first component (e.g., active collection) not only provides input to a second component (e.g., intelligent aggregation), but the second component also can provide feedback to the first component, such as further described below. Similarly, the three components on the right (e.g., shown in FIG. 1 as human acceleration (110); classifiers (112); and knowledge store (114)), draw information from the components on the left (e.g., shown in FIG. 1 as active collection and intelligent aggregation), while also contributing additional indicators as part of their own discovery process.

Domain Processing Overview

Figure 2:
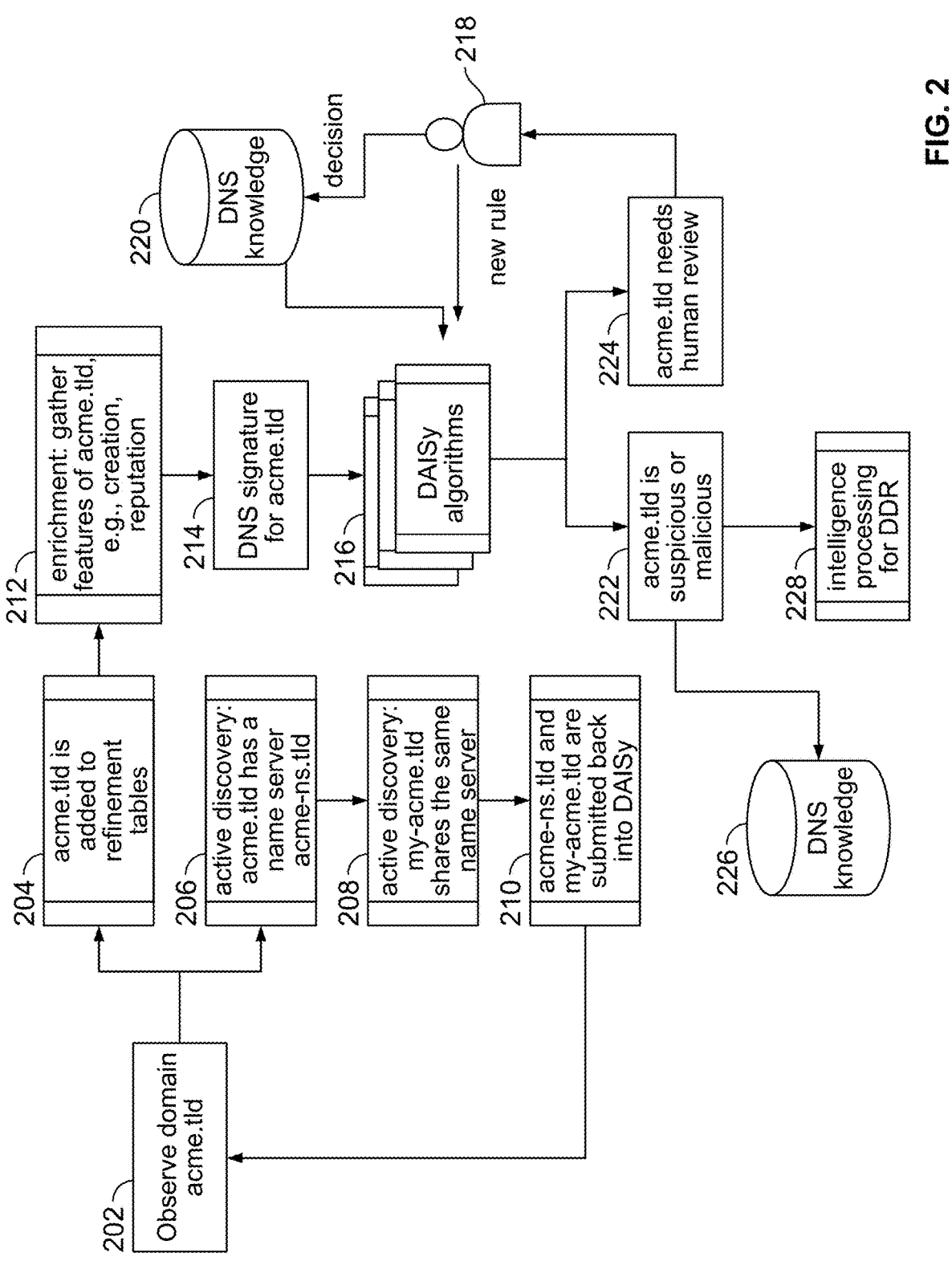
FIG. 2 illustrates a simplified view of the DAISy process for a single observed domain name acme.tld in accordance with some embodiments.

FIG. 2 illustrates a simplified view of the DAISy process for a single observed domain name acme.tld in accordance with some embodiments. FIG. 2 generally provides a simplified view of the DAISy process for a single observed domain name acme.tld. Specifically, if we consider DAISy limited to a single domain observation, regardless of the source, we can describe a simplification of the DAISy process and system as shown in FIG. 2. Suppose we observe a domain acme.tld from one of our data sources as shown at 202, then the operations performed using the DAISy process and system are as described below.

At 204, the domain acme.tld and its related source information, e.g., how many queries were observed and what the client IP address was, are added to refinement tables that are later used in algorithms.

At 206, active collection attempts are performed to identify domains and IP addresses that may be related to acme.tld and that the system may not already know about. Each of these will be resubmitted through the same DAISy process. For example, we may discover a new name server acme-ns.tld and a new domain my-acme.tld that shares that name server as shown at 208. Each of these would be fed back into DAISy as shown at 210.

At 212, enrichment data will be gathered for acme.tld. This includes both public and proprietary information such as the registration date and the reputation of the name server. In this example implementation, this data is also stored in refinement tables for use in downstream algorithms.

At 214, the composite view of acme.tld based on our enrichment and refinement aggregation can be viewed as a DNS signature for acme.tld. For example, this signature can be a combination of factual information, such as the domain is three days old, and statistical information, such as the likelihood of seeing this domain is 5%.

At 216, DAISy uses independent modular algorithms to determine whether acme.tld is suspicious, malicious, or unknown. Each algorithm performs an independent determination, and the result of every algorithm is separately forwarded to the DNS knowledge base and DDR system.

Each algorithm is responsible for annotating their determination for human interpretation later, such as shown at 218.

In some cases, some algorithms may not be able to make a deterministic decision on the domain and may require further human review, such as at 218.

At 218, in many cases, a human reviewer (e.g., a security professional, such as a threat researcher) can quickly create a new rule for DNS signatures, and the system will automatically detect future domains using that DNS signature without further human interaction. In another example implementation, ML models are applied to automatically generate such new rules for the DNS signatures. In an example implementation, such ML models can use statistical inferences that are based on threat intelligence data sets and their related DNS attributes. Specifically, DAISy can calculate the inferences by incorporating large amounts of these data points to form a global and extensive view of the DNS landscape. Accordingly, the disclosed techniques facilitate the ML models being able to compute highly accurate signatures.

Finally, the DNS knowledge base is updated as shown at 220.

As shown in FIG. 2, a component of the architecture is the use of human-in-the-loop analytics as an acceleration for automation. In traditional analytic systems, humans evaluate the quality of an algorithm's output or provide in-depth research on the results. In contrast, in the disclosed DAISy process and system, the human-in-the-loop (and/or MLT automation/verification, such as similarly described above) can be applied to increase automation by recording information in the DNS knowledge base, which is in turn used by the DAISy algorithms to adjudicate domains. We next describe a specific example of how this is accomplished.

Example: Name Server Driven Intelligence

As a specific example of how DAISy operates end-to-end, we can consider the detection of domains associated with suspicious or malicious name servers, including the detection of new name servers that may be malicious. This use case demonstrates a self-sustaining system that actively collects new information in the environment, uses multiple algorithms to make decisions, and leverages human-in-the-loop acceleration to improve the results.

A name server in DNS is a server which holds authoritative information for a domain, including its IP address. In many cases, a malicious actor controls both the name server and the domains it serves. A single name server may serve DNS records for one or thousands of domain names.

In order to create a self-sustaining name server-based intelligence system, we begin with an initial set of current name servers, some of which are known to be suspicious or malicious, others are legitimate. DAISy's active collection component queries for new domains served on these name servers and gathers enrichment information to be used in the DAISy name server algorithm. Additionally, the DNS knowledge base contains labels for known name servers, as either suspicious, malicious, or legitimate, such as shown at 222 or it is determined that further evaluation (e.g., human/MLT) is needed to review whether such is suspicious, malicious, or legitimate as shown at 224. The DAISy name server algorithm utilizes the data from these components, as described below.

In the DAISy name server algorithm, the name server itself acts as a DNS signature. As discussed further below, a DNS signature as used herein generally can include a set of characteristics, specific to DNS, which can be used to classify a domain. The disclosed DAISy name server algorithm is configurable so that it creates different outputs depending on the name server. For example, we can configure the algorithm so that the name server domain acme-ns.tld is considered malicious.

We may further configure the algorithm using our DNS knowledge base as shown at 226. The DNS knowledge base contains domain names and knowledge about those domains, including whether they are suspicious, malicious, legitimate, or unknown, and whether they are a name server. Each configuration can also use additional filters. For example, the acme-ns.tld configuration may determine that newly observed domains using that name server with a high risk score are malicious, while newly observed domains using that name server with a low risk score are suspicious. Each configuration provides a unique annotation for the DDR system, which can be applied for intelligence processing for DDR as shown at 228.

Figure 3:
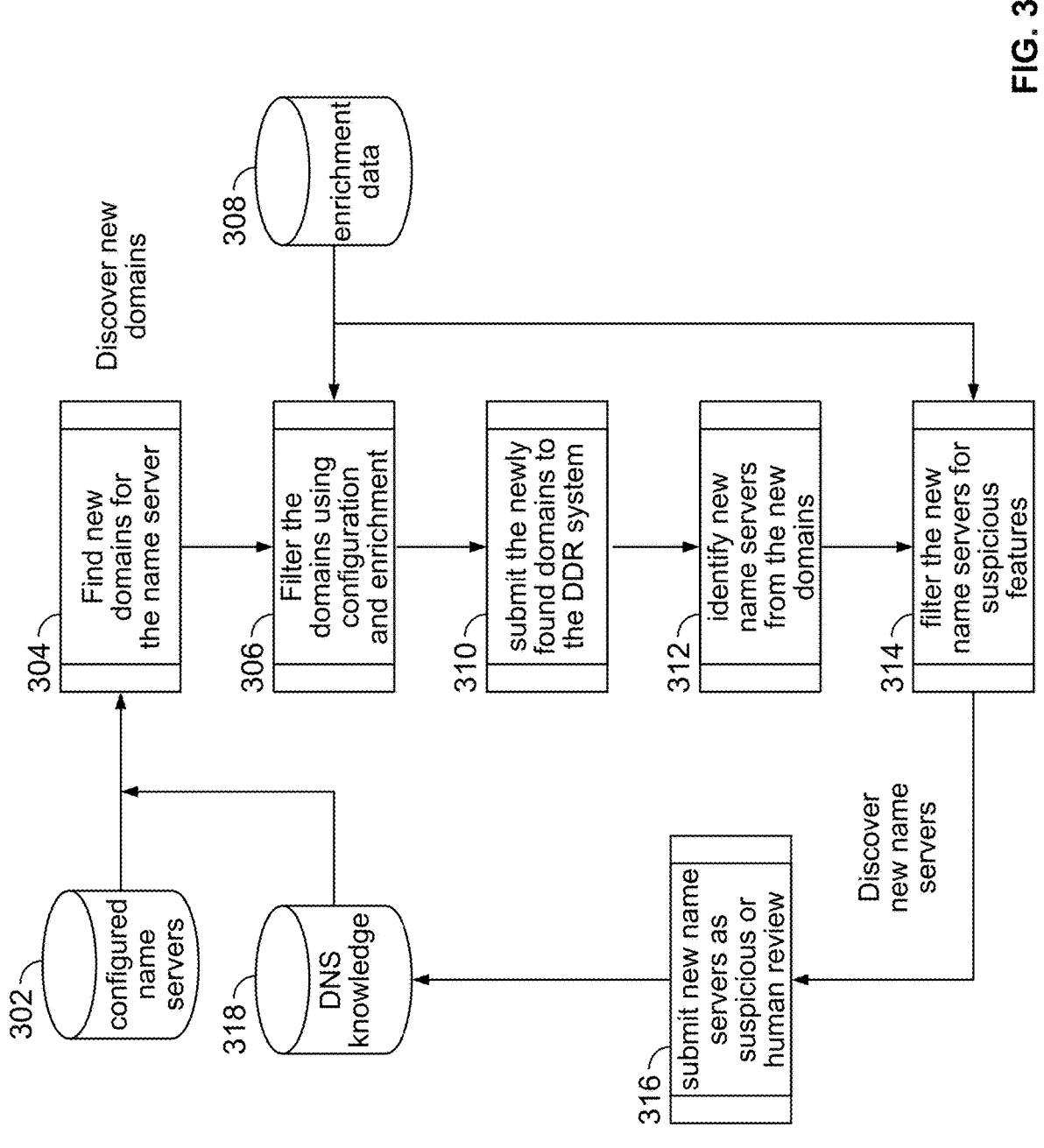
FIG. 3 is a flow diagram that illustrates the processing performed using the DAISy name server techniques to discover both new domains and name servers and to determine whether the domains and name servers are suspicious, malicious, or unknown in accordance with some embodiments.

FIG. 3 is a flow diagram that illustrates the processing performed using the DAISy name server techniques to discover both new domains and name servers and to determine whether the domains and name servers are suspicious, malicious, or unknown in accordance with some embodiments. As similarly described above and as will now be further described below with respect to FIG. 3, the DAISy name server algorithm discovers both new domains and name servers. It determines whether the domains and name servers are suspicious, malicious, or unknown, and it updates both the DDR system and the DNS knowledge base used by DAISy.

As shown in the FIG. 3, the name server algorithm within the DAISy framework is able to discover both new suspicious domains (304) and new suspicious name servers (302). The newly discovered name servers as shown in turn will be automatically incorporated into the next run of the algorithm. For example, the disclosed DAISy name server techniques, such as shown in FIG. 3, can be performed to: (1) detect new domain bad.com and automatically submit it as suspicious; (2) determine that bad.com also uses the name server acme-box.tld, which is not known to DAISy; (3) determine that acme-box.tld cannot be automatically classified as suspicious based on existing DNS signatures; (4) submit acme-box.tld to the knowledge base for human review; and (5) if human review determines that acme-box.tld is a suspicious or malicious name server, then domains using acme-box.tld as a name server will be automatically considered by DAISy in the next scheduled run of the algorithm.

The result of chaining the knowledge and discovery is a self-sustained system that continually identifies new malicious domains. This is improved by the human-in-the-loop that can convert a discovered name server from "unclassified" to "suspicious" or "malicious" that is then picked up for automation in the next run.

The configuration for this algorithm specifies both how to adjudicate a domain as well as how to annotate the result for the DDR system to use. An example configuration can include the following: (1) which name servers are part of the configuration (302); (2) filters (306) based on enrichment data (308) to determine whether to rate the domain as suspicious, malicious, or unknown; (3) detection properties for the DDR system to use (310) (e.g., confidence level and type of threat); (4) annotation intended for human consumption about the detection which provides supporting information about the detection (e.g., identify new name servers from the new domains) (312). As shown at 314, filtering is applied to determine the new name servers for the suspicious features, which can be submitted as suspicious or for human/ AI-ML review as shown at 316, and then added into the DNS knowledge store as shown at 318.

Because of the nature of the Internet and DNS, this algorithm creates a methodical solution to evaluate domains across the Internet. While it benefits from additional human input (e.g., such human input is not required, and various implementations of artificial intelligence (AI)/machine learning (ML) can similarly be used wherever human input is suggested as an option to the processing operations/ system for the disclosed DAISy techniques), it will continue to automatically discover and report malicious domains and name servers, making it a self-sustaining subsystem of DAISy.

Example. DNS C2 Detection

As another example for applying the DAISy techniques for DNS security, consider the detection of targeted malware command and control (C2) DNS beacons. In this threat category, domains that are used to create a signal back to a malicious actor are to be detected, potentially including some private information. A well-known example of this is the SolarWinds Sunburst threat disclosed in December 2020. In this case, a malicious actor had compromised common software via the supply chain. The compromised system then began beaconing, or signaling, out to the malicious name server. This signal was done via a DNS query with some encoded hostname information and was made inter- mittently. These types of attacks are technically challenging to detect, because they typically involve a small number of DNS queries that are distributed across time and networks.

DAISy can be used to detect this type of malware C2 beacon, because it keeps a historical aggregation of all DNS activity across networks, and it includes a human-in-the- loop component. DAISy maintains a full record of statistical properties of all domains over time as part of its intelligent aggregation. The purpose of this is to reduce the overall volume of data stored and to facilitate algorithms. As a result, DAISy can analyze weeks, months, and even years of data very efficiently.

In the case of C2 beacon detection, DAISy algorithms use the statistical properties of all domain names known to the system over time to identify outliers. This process uses a DNS fingerprint for outliers, as will be further described below. In particular, DAISy algorithms can look back through the historical records to identify domains that have an unusual combination of statistical properties consistent with C2 beacons. The algorithm can then leverage an additional component of the system, the human-in-the-loop, by submitting the detection for review into the DAISy DNS knowledge base.

The nature of DAISy allows it to handle statistical algo- rithms like beacon detection and configuration algorithms like the name server algorithm above with the same infra- structure and data summaries.

Example DAISy Components

Figure 4:
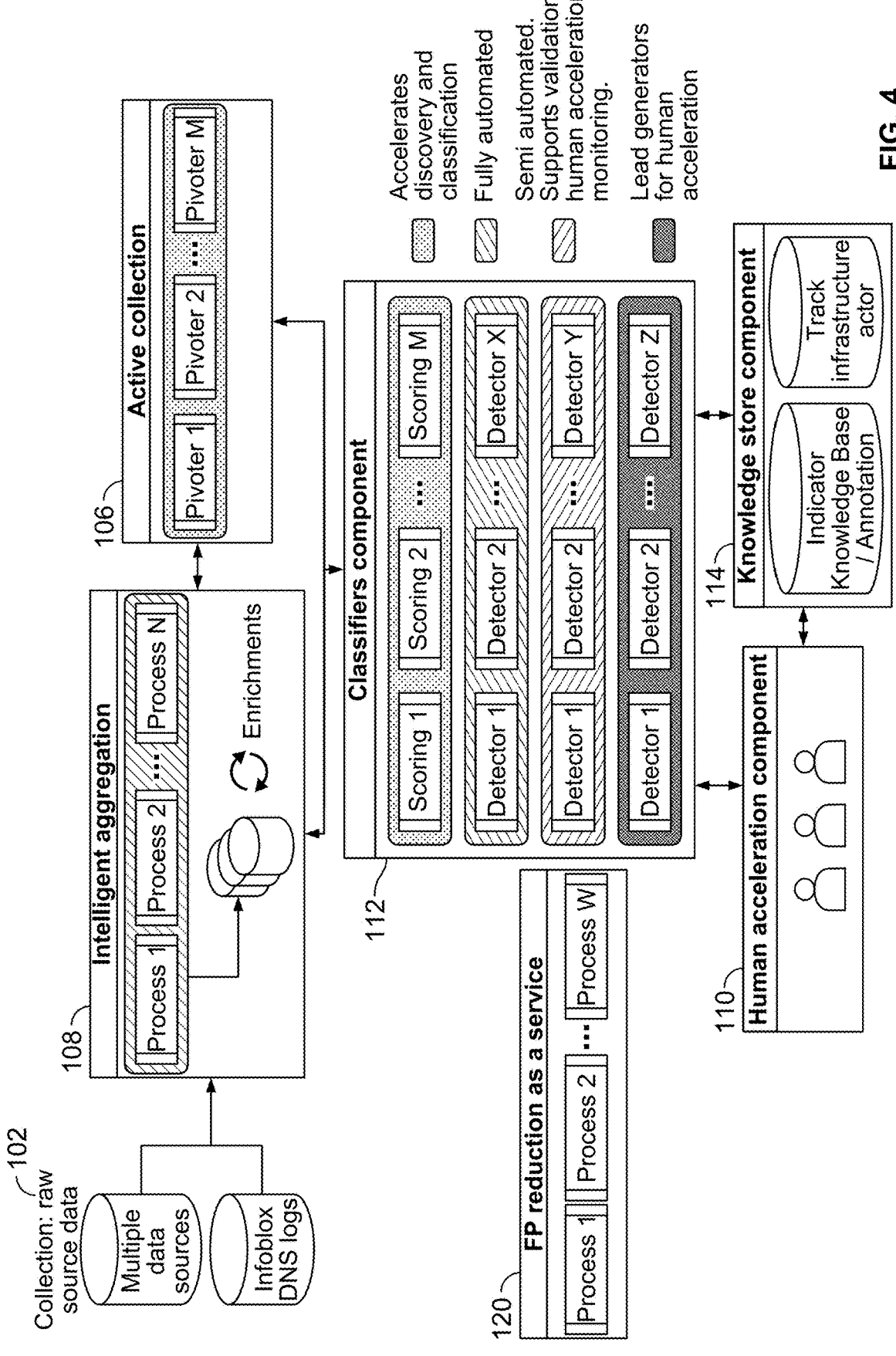
FIG. 4 illustrates an overview of the DAISy system and its components in accordance with some embodiments.

FIG. 4 illustrates an overview of the DAISy system and its components in accordance with some embodiments. Now that we have seen the overall flow of DAISy and some specific examples of use cases for the system, we will look more closely at the components of an example implemen- tation of the DAISy system. In FIG. 4, we show the major components of DAISy and how they interact with each other in this example implementation. In the following sections, we will discuss active collection, DNS signatures, and intelligent aggregation in more detail. We have already highlighted the role of human acceleration and our knowl- edge base. The false positive (FP) reduction service is an important, but external, component that attempts to remove false positives (FPs) from the algorithms before they are made available to the DDR system.

Intelligent Aggregation Component

An important and early-stage component of the system includes aggregating the data collected from various data sources and networks, such as shown at 102 in FIG. 4 (e.g., including multiple data sources, such as multiple networks, and DNS logs, such as Infoblox DNS logs as shown), in which the main data collected comes from our resolvers. This is referred to as the intelligence aggregation compo- nent, such as shown at 108 in FIG. 4, because we intelli- gently aggregate the data to provide summarized statistics and information of all domains seen in the system over time. This way we can collect DNS behavior statistics in a summarized manner that facilitates computationally efficient processing and repeated analysis. The data collected through these processes is of high importance for the detection of resources that are hard to detect through existing traditional methods, such as identifying behavior with small signals (e.g., DNS exfiltration). A key differentiator of the data collected through our resolvers is that we gather DNS behavior for multiple networks (e.g., distinct enterprise networks), which gives us visibility across distinct networks to be able to compare and identify suspicious DNS behavior to help protect everyone.

In this example implementation, in addition to the data that comes from our collectors, we supplement our data by using various third party vendors in order to increase cov- erage, improve our ability to detect threats early, and stay ahead of threat actors before they can get to the networks served by the DDR system. The data goes through multiple steps to summarize them into different sets that contain relevant information for specific use cases. Most impor- tantly, the goal of the multi-step processing is to create smaller sets in each phase, to enable efficient and optimized processing for fast discovery.

With intelligent aggregation, we are able to keep a very long history of data in a compact format. A DNS recursive resolver can see 30-100 billion queries per day, which is cost prohibitive to store and analyze. In DAISy, all source data is included in context-specific aggregation that is used by the algorithms to discover threats over time. For example, the disclosed DAISy system and process can perform the fol- lowing: (1) keep track of the first and last seen date of every domain from every data source; (2) keep aggregate statistics for every domain seen via DNS including, for example, the number of subdomains, the total queries, the number of resolutions, the number of non-existent domain (NXDO- MAIN) responses, and the unique number of networks in which the domain is observed; (3) keep track of change information, for example, the change of name servers for domains; and (4) record statistical information used for reputation scores, such as the top level domain (TLD), name server, autonomous system number (ASN), and mail servers.

Active Collection Component

Active collection, such as using active collection compo- nent 106 as shown in FIG. 4, along with intelligent aggre- gation, is another early processing stage of DAISy to enable effective and efficient processing and detection for advanced DNS security. Active collection in this example implemen- tation refers to the use of decoupled subprocesses that utilize robust pivoting strategies to find related DNS data yet unseen in our networks. Active collection occurs in parallel with intelligent aggregation and there is no direct precedence of either component.

Active collection utilizes our previously aggregated data, third party DNS data, and elements of the DNS, to increase DAISy's overall visibility of DNS data. If DAISy were only to rely on the resolver, or internal data, our data would be biased and thus decrease the overall effectiveness of the system. By bias in this context, we mean that the data collected would be limited to smaller subsets or sources, which does not represent a complete-enough picture of DNS. For example, DNS data can often vary significantly across different networks, regions, and organizations. Active collection of data outside of the networks, using "seeds" from both inside and outside of the networks, seeks to remove this bias, thereby enhancing DAISy's protective capabilities. Active collection takes initial seeds and pivots on various elements of the DNS to find new and related domains. On top of what was previously mentioned (e.g., using nameserver records to pivot), active collection can use any DNS record: A records, AAAA records, SOA records, MX records, etc. The results of active collection then become fodder for intelligent aggregation, harvesting of DNS signatures, and/or classification, and vice versa.

For example, one active collection subprocess centers around finding newly observed domains using aggregated name servers. For all aggregated nameservers that DAISy has seen historically, we actively collect newly observed domains seen using each previously seen name server using global passive DNS (pDNS). Another subprocess relies on ICANN zone files. We actively collect ICANN zone files and parse them to identify newly registered domains, as well as expired domains and changes in active domains' DNS records. Notice that this data is wholly external to our resolver data; while some newly registered ICANN domains may have appeared in resolver data already, active collection ensures we ingest as many newly registered domains as possible.

In summary, the use of decoupled subprocesses and robust pivoting strategies allows active collection to uncover DNS data that has not been seen within our networks before. This process occurs simultaneously with intelligent aggregation, without one component taking precedence over the other in this example implementation. By incorporating previously aggregated data, third-party DNS data, and elements of the DNS, active collection enhances DAISy's overall visibility and mitigates bias that may arise from relying solely on internal network data. Active collection leverages various DNS records and sources, ensuring a complete DNS picture and greater protection.

DNS Signature and Classification

DAISy's threat intelligence classifiers, such as using classifiers component 112 as shown in FIG. 4, use a DNS specific and signature-based approach to identify malicious and suspicious domains. These signatures are either heuristically and manually selected or automatically derived from data sources that contain DNS properties. We typically compare these signatures to newly seen domains within internal and global networks, and then tag a verdict label according to the DNS rule definition associated with the matching signature. Under certain circumstances, we also perform retrospective analysis on our data by scanning historical DNS logs for domains that match specific signatures. This is performed on an ad hoc basis during investigations of specific threat incidents or campaigns in this example implementation.

DNS Signature

Similar to malware file-based signatures, a DNS signature contains a combination of predetermined attributes that a classifier uses to identify and label malicious cyber artifacts. The main difference is that the attributes are not based on files, but associated with domains, such as their names, DNS configuration, WHOIS registration information, and/or other attributes.

A key advantage of using DNS over file-based signatures is that it offers superior scalability and greatly reduces a classifier's computing overhead. Typically, the process of comparing file contents to signatures is far more compute intensive than comparing to DNS data. The content size of a file is normally much greater than the size of a DNS packet. Thus, it is far more taxing on the system's working memory to load the data and adds to the processing time to walk through the entire data string during signature matching operations.

DNS signature creation typically begins with a heuristic evaluation of a set of domains possibly linked to a specific cyber campaign. This process is either performed manually by a security professional (e.g., a threat researcher) or via automated analytics (e.g., AI/ML automated analysis and/or other automated heuristic-based analysis, etc.). The system expresses DNS signatures via a threat rule definition, which is a dictionary containing a set of logical conditions, related intelligence classification labels, tags, and RPZ feed-specific time-to-live (TTL) values.

Manual DNS Signature Creation

When the process of signature creation is done manually, such as will be further described below with respect to FIG. 5, a security professional (e.g., a threat researcher) performs a heuristic evaluation on a group of potentially malicious domains. If the analysis reveals unique and effective identifiers, the researcher creates a DNS signature, a set of heuristics or rule-based logic that we use for determining the verdict of an unknown domain.

FIG. 5 is a hypothetical example of a threat researcher manually creating a DNS signature after identifying DNS textual and configuration patterns in accordance with some embodiments. In this phishing campaign, the C2 domains show a CNAME field, such as shown at 502 in FIG. 5, that points to an external domain, has the prefix bank-, SOA email addresses with the prefix root@, and nameservers using the domain's own name, as well as an answer count that is consistently 4. As such, a threat researcher, such as shown at 504 in FIG. 5, can utilize such attribute(s) to generate a new DNS signature, such as shown at 506 in FIG. 5.

Automated DNS Signature Generation

Figure 6:
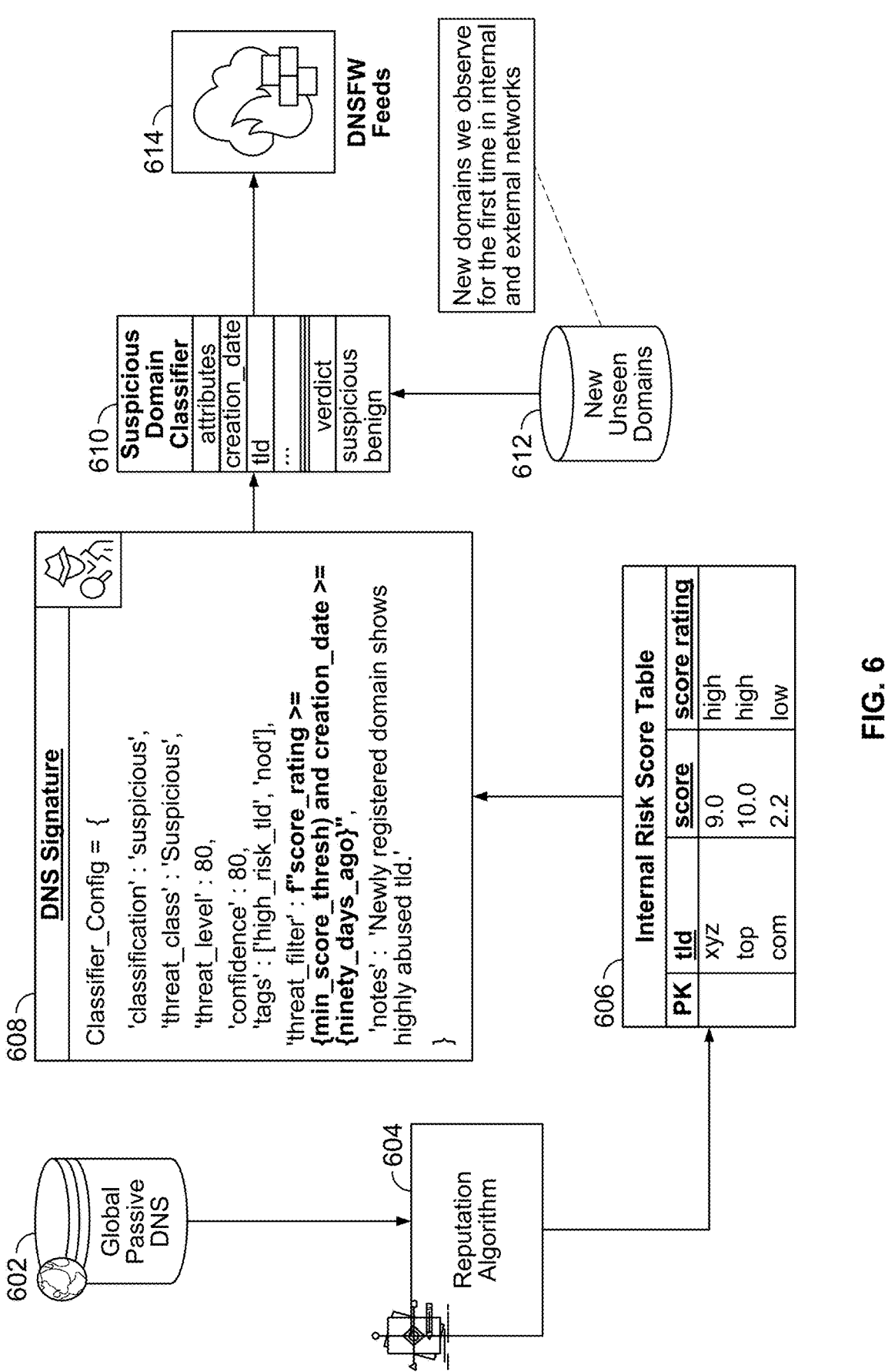
FIG. 6 illustrates automated DNS signature generation in accordance with some embodiments.

FIG. 6 illustrates automated DNS signature generation in accordance with some embodiments. Generally, FIG. 6 illustrates an example implementation for statistically and automatically generating DNS Signatures. The primary limitation of a manually built heuristic signature is that our detections are restricted to only the malicious DNS patterns we have identified. This leaves a gap in our knowledge base given that threat actors change their tactics, techniques, and procedures (TTPs) constantly and keeping pace with the ever growing cyber threats is virtually impossible, especially for a relatively small intelligence team. To counter this challenge, as well as detect at scale and achieve a higher DDR feed coverage level, we automatically and dynamically build signatures according to the threats we observe in the DNS landscape.

Specifically, such DNS signatures are automatically generated and derived from our automated statistical analysis of global pDNS data 602 that is representative of the DNS world. The conditions and thresholds of the signatures are dynamically populated from the analysis results. For example, we operate processes that statistically determine the reputation using a reputation algorithm(s) 604 (e.g., likelihood of engaging harmful content) of various DNS entities, such as nameservers, autonomous system numbers (ASNs), top-level domains (TLDs), registrars, and geo-locations. An internal risk score table is generated based on the reputation analysis as shown at 606. We use these results to build some of our DNS signatures, such as shown at 608, that are designed to find domains showing low reputation values for two or more DNS attributes. For some of our classifiers, such as a suspicious domain classifier 610, this information is a key factor for determining whether an unseen domain, such as new unseen domains 612, is a suspicious or benign domain. The results/output of suspicious domain classifier 610 is provided to DNS firewall (FW) feeds as shown at 614.

Domain Lifecycle

Figure 7:
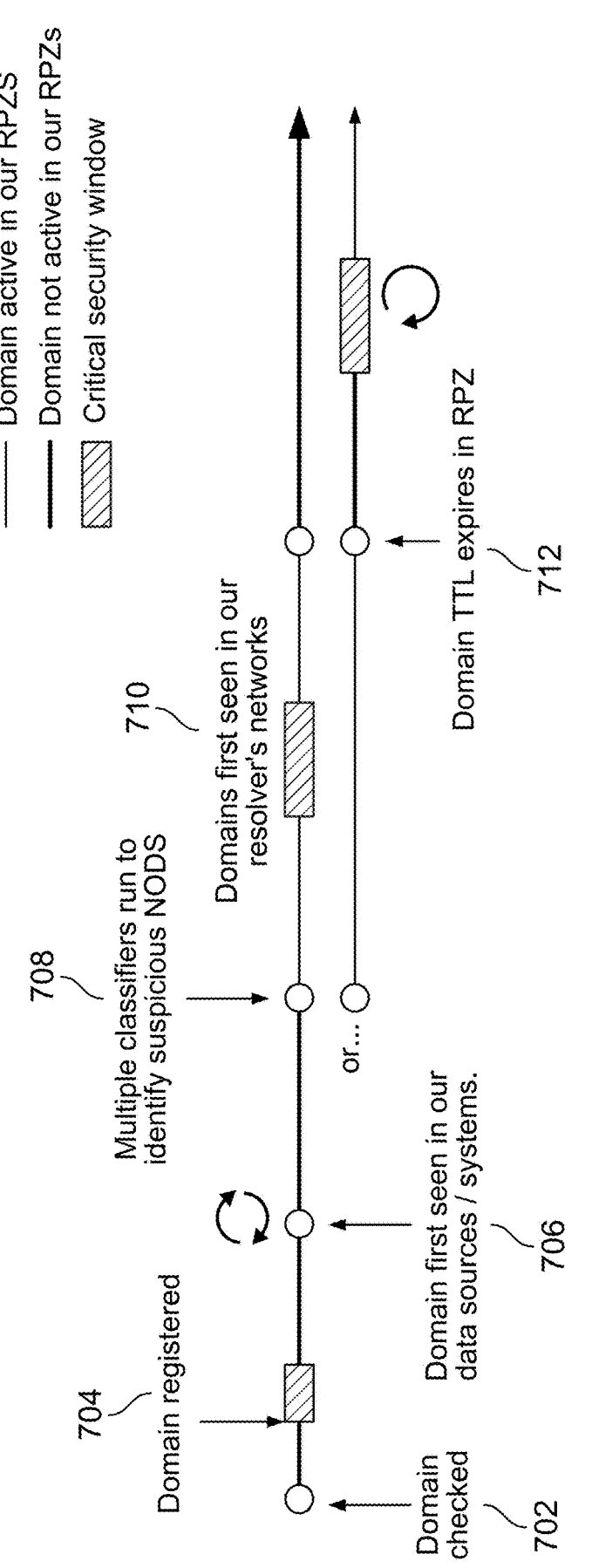
FIG. 7 illustrates an overview of domain lifecycle in accordance with some embodiments.

FIG. 7 illustrates an overview of domain lifecycle in accordance with some embodiments. In this example implementation, DAISy is designed to identify suspicious domains early in their lifecycle and make a determination as soon as they enter our systems, but it also continues to revisit the domain over time. The goal is for us to be able to track information about a domain through its entire lifecycle and make decisions along the way that are focused on protecting networks and continuously gathering information over time.

The domain lifecycle begins when we first observe the domain through our systems (702). This may occur for different reasons, for example, when the domain is registered and recorded in the TLD zone data (704), or when the domain enters an Infoblox-monitored network for the very first time (706). Then the domain will be enriched with other threat intelligence and intelligently summarized for efficient data consumption and classification. Next, our algorithms/classifiers determine whether the domain is suspicious or malicious based on the available DNS features and behavior of that domain (708). This method gives us an advantageous opportunity to detect and block domains before they are weaponized or active.

One approach to DNS intelligence is to keep a running list of malicious domains that never expire. This approach, however, is impractical for DDR systems. There are tens of millions of malicious domains detected as threats every year, hundreds of thousands every day, and it is important to age off domains to ensure performance of the DDR system. On the other hand, we want to maximize the coverage of malicious domains that are actively used by bad actors.

DAISy attempts to handle this problem by revisiting a domain repeatedly in an attempt to ensure that the intelligence on a domain is current. This approach allows us to maximize threat coverage and maintain timely data. FIG. 7 highlights the "critical security window," meaning what is the best timing and phase in their lifecycle that we should ensure that we tackle these domains.

Referring to FIG. 7, the timeline shows that we start gathering information and behavior for a domain as soon as or shortly after they are registered, because that allows us to detect suspicious behavior/signatures and block them via our DDR resolvers (710) before these resources have a chance to cause damage to networks. On the other hand, it is important that we revisit domains that are first seen in our resolver's networks to collect additional information and make sure that the DDR resolver has up-to-date and relevant data. In addition, previously identified suspicious resources are revisited if their time-to-live (TTL) has expired and if they are still active (712), to ensure continuous protection that is current and relevant.

Human Acceleration Component

Figure 8:
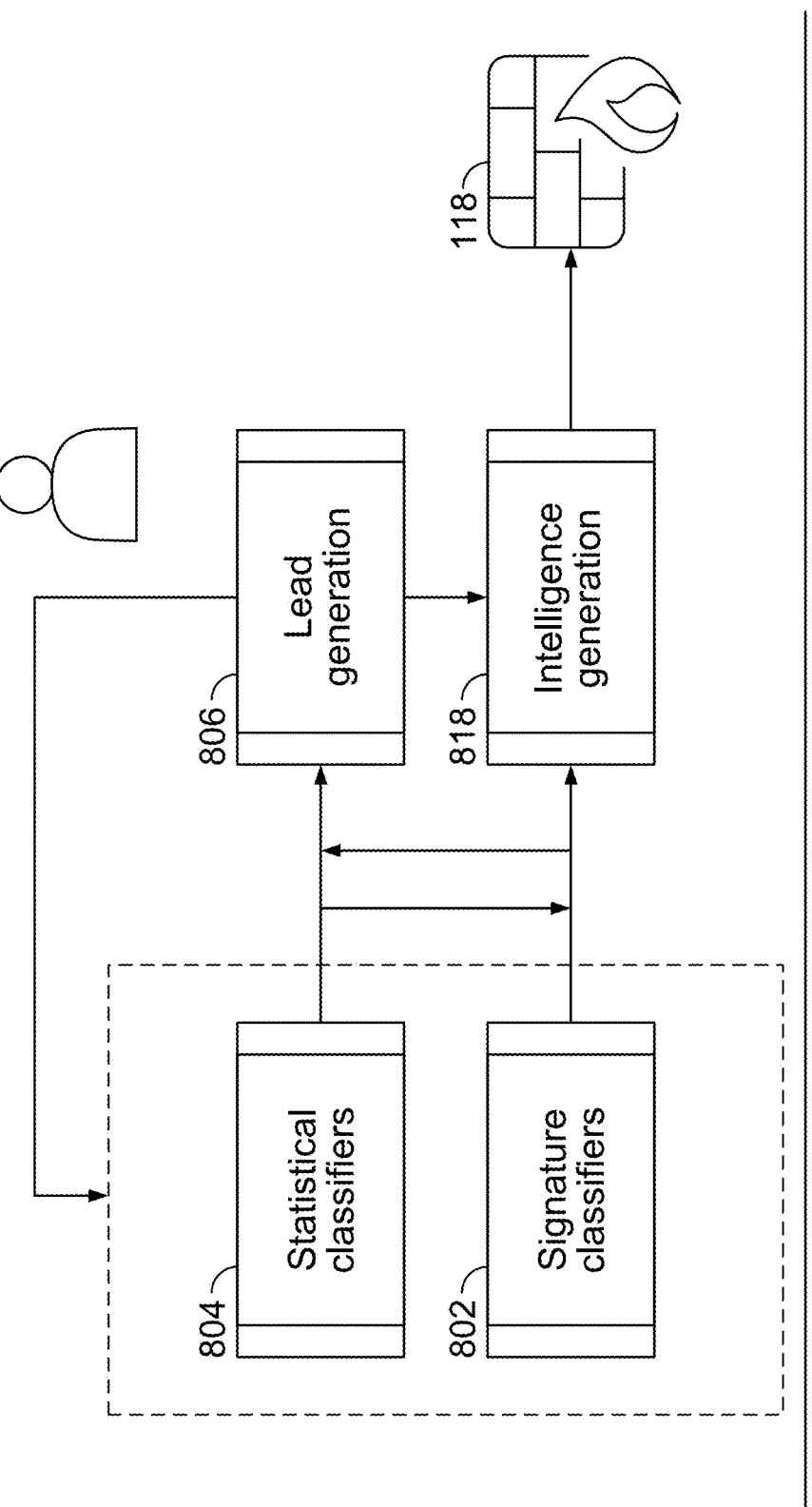
FIG. 8 illustrates a human acceleration component in accordance with some embodiments.

FIG. 8 illustrates a human acceleration component in accordance with some embodiments. DAISy, while featuring many automated components, can also benefit from the interplay of humans and machines. In some cases, humans can offer the expertise necessary to evaluate system output, provide in-depth research to magnify the overall threat intelligence picture, contribute to increasing automation, and enhance the system's threat intelligence capabilities overall. As such, FIG. 8 shows how DAISy can also leverage humans-in-the-loop to increase DDR effectiveness.

Because DAISy uses DNS signatures, both heuristic (802) and statistical classifiers (804), and because threat actors change tactics, techniques, and procedures (TTPs) to evade detection by DDR systems such as DAISy, human evaluation of output is necessary to ensure the intelligence is consistently relevant and maximally effective. The application of human expertise allows for DAISy's statistical classifiers to be fine-tuned, thereby reducing noise and increasing the number of true positives. A balance is struck between autonomous classification and human-guided feedback, ensuring defensible and efficient production of threat intelligence. In effect, a feedback loop is created, increasing the effectiveness of DAISy's underlying algorithms (e.g., classifiers, etc.).

Additionally, humans-in-the-loop perform in-depth research that contributes to the overall threat intelligence picture, such as for lead generation as shown at 806 in FIG. 8. DAISy's output is not meant to simply be a data feed, or pure threat information. DAISy's output is threat intelligence (818), which is derived from information, and provided to a DNS firewall (FW) feed and/or to DNS security platform 118 for enhanced DNS security. Humans can perform the detailed analysis of threats necessary to turn information into intelligence for consumers.

In performing research, humans identify areas in which new classifiers, statistical or heuristic-based, can be built. As shown at 806 in FIG. 8, this is labeled "lead generation." New actors, TTPs, or both are discovered during day-to-day research and are considered candidates for new classifiers or leads. On top of this, humans can hold multiple contexts in their heads at one time: the past, present, and future threat landscapes, for example. This ensures the system can sufficiently be maintained and built upon to ensure precise threat intelligence at any given time. Other contexts might include the severity and potential impact of threats, allowing for more effective allocation of resources and a greater focus of research on a specific threat.

Various process embodiments for DNS automated intelligence (DAISy) will now be further described below.

Example Process Embodiments for a DNS Automated Intelligence (DAISy)

Figure 9:
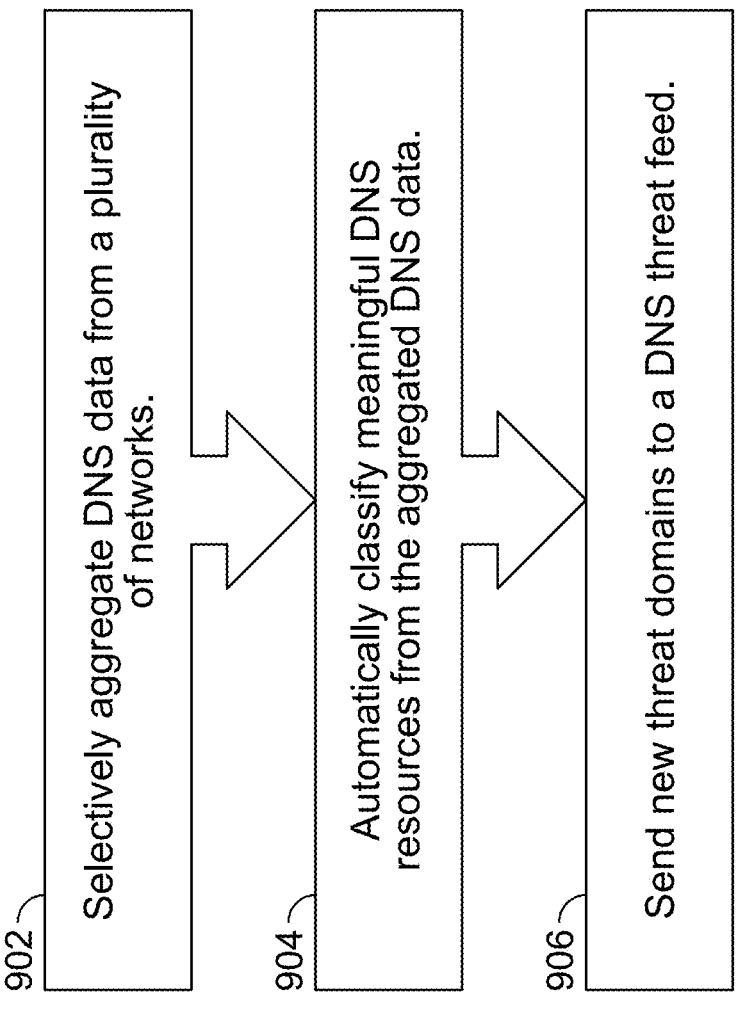
FIG. 9 is a flow diagram for providing DNS automated intelligence in accordance with some embodiments.

FIG. 9 is a flow diagram for providing DNS automated intelligence in accordance with some embodiments. In some embodiments, a process as shown in FIG. 9 is performed by a DNS automated intelligence system (DAISy) (e.g., DAISy components 104 as shown in FIG. 1, and/or other components), and techniques as similarly described above including the embodiments described above with respect to FIGS. 1-8.

At 902, selectively aggregating DNS data from a plurality of networks is performed, such as similarly described above with respect to FIGS. 1-8.

At 904, automatically classifying meaningful DNS resources from the aggregated DNS data is performed, such as similarly described above with respect to FIGS. 1-8.

At 906, sending new threat domains to a DNS threat feed is performed, such as similarly described above with respect to FIGS. 1-8. For example, the new threat domains can be sent to a DNS firewall (FW) feed and/or to DNS security platform 118 for enhanced DNS security, such as similarly described above.

Figure 10:
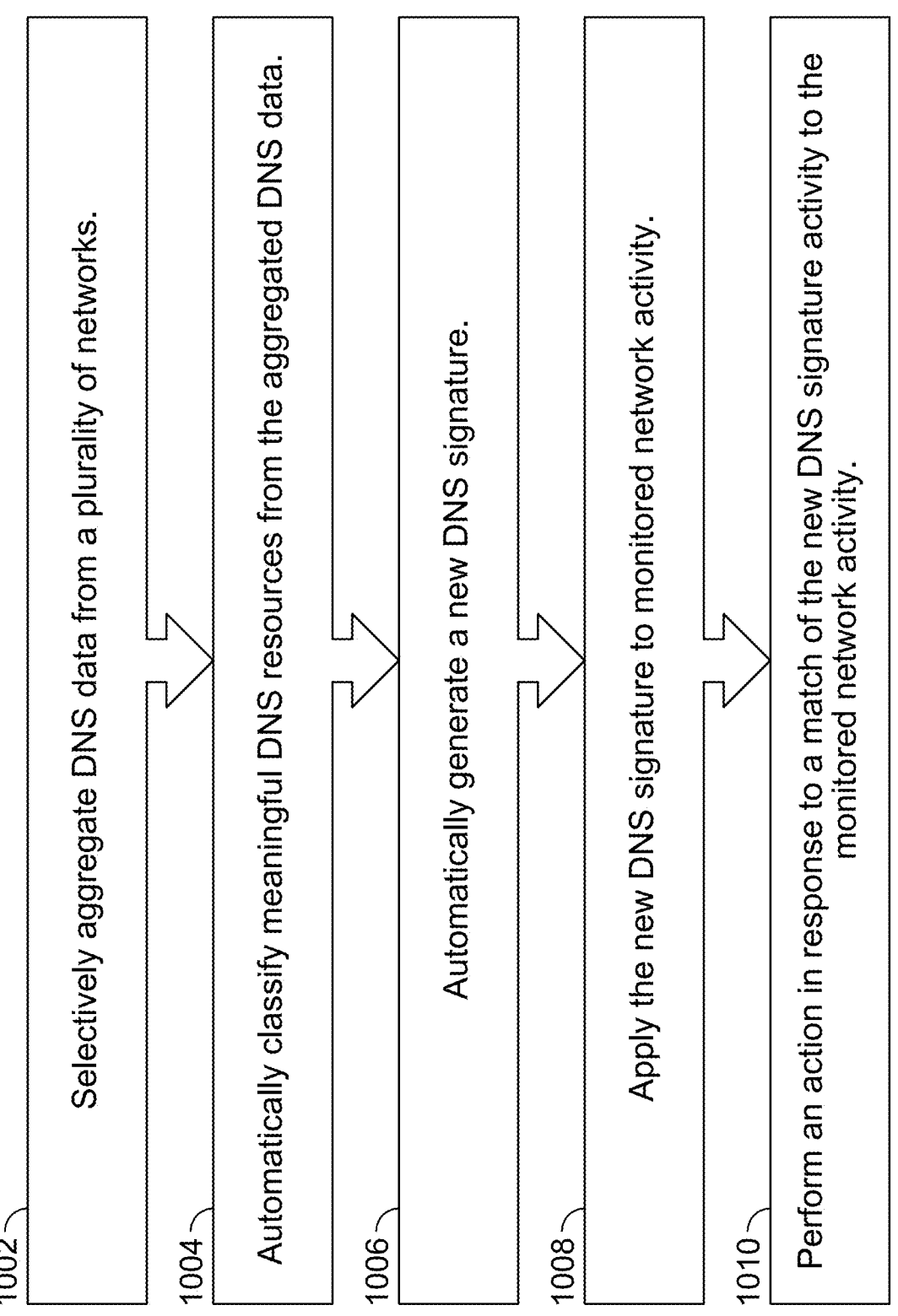
FIG. 10 is another flow diagram for providing DNS automated intelligence in accordance with some embodiments.

FIG. 10 is another flow diagram for providing DNS automated intelligence in accordance with some embodiments. In some embodiments, a process as shown in FIG. 10 is performed by a DNS automated intelligence system (DAISy) (e.g., DAISy components 104 as shown in FIG. 1, and/or other components), and techniques as similarly described above including the embodiments described above with respect to FIGS. 1-8.

At 1002, selectively aggregating DNS data from a plurality of networks is performed, such as similarly described above with respect to FIGS. 1-8.

At 1004, automatically classifying meaningful DNS resources from the aggregated DNS data is performed, such as similarly described above with respect to FIGS. 1-8.

At 1006, automatically generating a new DNS signature is performed, such as similarly described above with respect to FIGS. 1-8.

At 1008, applying the new DNS signature to monitored network activity is performed, such as similarly described above with respect to FIGS. 1-8.

At 1010, an action is performed in response to a match of the new DNS signature activity to the monitored network activity, such as similarly described above with respect to FIGS. 1-8. For example, responsive actions can include one or more of the following, such as similarly described above: (1) blocking the suspicious domain in near real-time at a DNS security platform, wherein the suspicious domain is blocked at least for a predetermined period of time; (2) blocking a spear phishing attack at a DNS security platform; (3) reporting the suspicious domain for a first network based on a DNS security policy associated with the first network; (4) generating an alert for the suspicious domain for a first network based on a DNS security policy associated with the first network; (5) performing further analysis of the suspicious domain to verify that the suspicious domain is malicious or a false positive; and/or (6) various other responsive actions or combinations thereof can similarly be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

selectively aggregate DNS data from a plurality of networks;

automatically classify DNS resources from the aggregated DNS data, comprising to:

identify a new domain from the aggregated DNS data;

determine at least one name server associated with the new domain;

classify the at least one name server based on a set of existing DNS signatures, wherein one DNS signature of the set of existing DNS signatures includes a set of characteristics, wherein the set of characteristics includes one or more of the following: a top level domain (TLD), a name server, autonomous system number (ASN), and/or a mail server;

determine that the at least one name server is malicious; and in response to a determination that the at least one name server is malicious, determine that the at least one name server is a new threat domain;

send new threat domains to a DNS threat feed; and perform the following action in response to identification of the new threat domain, comprising to:

block the new threat domain at a DNS security platform; and a memory coupled to the processor and configured to provide the processor with instructions.

2. The system recited in claim 1, wherein a new domain server is identified as a compromised or an inherently malicious or suspicious name server.

3. The system recited in claim 1, wherein a new domain server is identified as a compromised or an inherently malicious or suspicious name server, and wherein new domains associated with the new domain server are monitored to identify new malicious domains.

4. The system recited in claim 1, wherein the aggregated DNS data is collected from a plurality of monitored enterprise, university, and/or government networks.

5. The system recited in claim 1, wherein the processor is further configured to:

report a new threat domain for a first network based on a DNS security policy associated with the first network.

6. The system recited in claim 1, wherein the processor is further configured to:

quarantine an unclassified domain for further security professional review to update configuration for a classifier.

7. The system recited in claim 1, wherein the processor is further configured to:

automatically generate a new DNS signature for a new DNS threat using a statistical classifier.

8. The system recited in claim 1, wherein the processor is further configured to:

periodically revisit the new threat domains during a predetermined time window to update threat intelligence information associated with the new threat domains.

9. A method, comprising:

selectively aggregating DNS data from a plurality of networks;

automatically classifying DNS resources from the aggregated DNS data, comprising:

identifying a new domain from the aggregated DNS data;

determining at least one name server associated with the new domain;

classifying the at least one name server based on a set of existing DNS signatures, wherein one DNS signature of the set of existing DNS signatures includes a set of characteristics, wherein the set of characteristics includes one or more of the following: a top level domain (TLD), a name server, autonomous system number (ASN), and/or a mail server;

determining that the at least one name server is malicious; and in response to a determination that the at least one name server is malicious, determining that the at least one name server is a new threat domain;

sending new threat domains to a DNS threat feed; and
performing the following action in response to identifi-
cation of the new threat domain, comprising:
blocking the new threat domain at a DNS security
platform.

10. The method of claim 9, wherein a new domain server
is identified as a compromised or an inherently malicious or
suspicious name server.

11. The method of claim 9, wherein a new domain server
is identified as a compromised or an inherently malicious or
suspicious name server, and wherein new domains associ-
ated with the new domain server are monitored to identify
new malicious domains.

12. The method of claim 9, wherein the aggregated DNS
data is collected from a plurality of monitored enterprise,
university, and/or government networks.

13. A computer program product embodied in a non-
transitory computer readable medium and comprising com-
puter instructions for:
selectively aggregating DNS data from a plurality of
networks;
automatically classifying DNS resources from the aggre-
gated DNS data, comprising:

identifying a new domain from the aggregated DNS
data;
determining at least one name server associated with
the new domain;
classifying the at least one name server based on a set
of existing DNS signatures, wherein one DNS sig-
nature of the set of existing DNS signatures includes
a set of characteristics, wherein the set of character-
istics includes one or more of the following: a top
level domain (TLD), a name server, autonomous
system number (ASN), and/or a mail server;
determining that the at least one name server is mali-
cious; and
in response to a determination that the at least one name
server is malicious, determining that the at least one
name server is a new threat domain;
sending new threat domains to a DNS threat feed; and
performing the following action in response to identifi-
cation of the new threat domain, comprising:
blocking the new threat domain at a DNS security
platform.

\* \* \* \* \*